US012569057B2

(12) United States Patent
Zhang et al.

(10) Patent No.: US 12,569,057 B2
(45) Date of Patent: Mar. 10, 2026

(54) TOOTHBRUSH FILAMENT AND PREPARATION METHOD THEREFOR, AND TOOTHBRUSH

(71) Applicants: PEKING UNIVERSITY SCHOOL OF STOMATOLOGY, Beijing (CN); BEIJING PIEZO-DENT MEDICAL TECHNOLOGY CO., LTD, Beijing (CN)

(72) Inventors: Xuehui Zhang, Beijing (CN); Xuliang Deng, Beijing (CN); Yanhui Lu, Beijing (CN); Shenpo Yuan, Beijing (CN)

(73) Assignees: PEKING UNIVERSITY SCHOOL OF STOMATOLOGY, Beijing (CN); BEIJING PIEZO-DENT MEDICAL TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 18/863,457

(22) PCT Filed: Jun. 28, 2022

(86) PCT No.: PCT/CN2022/101855
§ 371 (c)(1),
(2) Date: Nov. 6, 2024

(87) PCT Pub. No.: WO2023/216387
PCT Pub. Date: Nov. 16, 2023

(65) Prior Publication Data
US 2025/0288090 A1      Sep. 18, 2025

(30) Foreign Application Priority Data

May 9, 2022 (CN) .......................... 202210502051.9
Jun. 10, 2022 (CN) .......................... 202210655802.0

(51) Int. Cl.
A46D 1/04 (2006.01)
B29C 71/00 (2006.01)
B29C 71/02 (2006.01)

(52) U.S. Cl.
CPC ............ *A46D 1/04* (2013.01); *B29C 71/0081* (2013.01); *B29C 71/02* (2013.01); *B29C 2071/022* (2013.01)

(58) Field of Classification Search
CPC ...... A46D 1/04; B29C 71/0081; B29C 71/02; B29C 2071/022
See application file for complete search history.

(56) References Cited

FOREIGN PATENT DOCUMENTS

CN 110042481 A 7/2019
CN 110088366 A 8/2019
(Continued)

OTHER PUBLICATIONS

Notification to Grant Patent Right for Invention issued in Chinese Patent Application No. 202210655802.0; mailed Jan. 9, 2024; 3 pages.
(Continued)

*Primary Examiner* — Andrew A Horton
(74) *Attorney, Agent, or Firm* — HAUPTMAN HAM, LLP

(57) ABSTRACT

A toothbrush filament preparation method, a prepared toothbrush filament, and a toothbrush. The toothbrush filament preparation method comprises: melting and extruding a piezoelectric polymer, and executing a corona polarization step and an annealing step, such that the piezoelectric constant of a toothbrush filament in a standing state is greater than or equal to 0.4 pC/N, and some polarization charges stably exist on the surface of the toothbrush filament. The problem of bacteria breeding on a toothbrush filament in a standing state can be effectively relieved by (Continued)

utilizing the action principle of physical electrical stimulation for an antibacterial purpose, thereby improving the antibacterial properties of the toothbrush filament.

3 Claims, 8 Drawing Sheets

(56) References Cited

FOREIGN PATENT DOCUMENTS

| CN | 110306248 | A | 10/2019 |
| CN | 113974511 | A | 1/2022 |
| JP | H01181804 | A | 7/1989 |

OTHER PUBLICATIONS

International Search Report and Written Opinion issued in PCT/CN2022/101855, mailed Dec. 22, 2022, 12 pgs.
First Office Action issued in Chinese Patent Application No. 202210655802.0, mailed Dec. 15, 2022; 8 pg.s.
Second Office Action issued in Chinese Patent Application No. 202210655802.0, mailed Jul. 28, 2023; 12 pgs.
Jun, Li, et al; Common General Knowledge—1, Piezoelectric material; Testing Technology and Instruments 2nd Edition; dated Jun. 30, 2000; 14 pgs.

TOOTHBRUSH FILAMENT AND PREPARATION METHOD THEREFOR, AND TOOTHBRUSH

The present application is a U.S. National Phase of International Application Number PCT/CN2022/101855 filed on Jun. 28, 2022, which claims the priority to the Chinese patent application No. 202210502051.9 filed on May 9, 2022 with the Chinese Patent Office and entitled "TOOTHBRUSH FILAMENT AND PREPARATION METHOD THEREFOR, AND TOOTHBRUSH", and the priority to the Chinese patent application No. 202210655802.0 filed on Jun. 10, 2022 with the Chinese Patent Office and entitled "TOOTHBRUSH FILAMENT AND PREPARATION METHOD THEREFOR, AND TOOTHBRUSH", the disclosures of which are incorporated herein by reference in their entirety.

TECHNICAL FIELD

The present application relates to the technical field of oral cleaning, in particular to a toothbrush filament and a preparation method therefor, and a toothbrush.

BACKGROUND

Toothbrushes belong to daily life supplies, and their function is to scrub away residues left in the mouth and clean teeth and gums, so as to keep the mouth clean and hygienic. Conventional toothbrush filaments are generally made of natural bristles or nylon materials.

Natural bristles are better than nylon materials in terms of both the cleaning effect and the capability to absorb toothpaste, but their range of application is restricted as a result of the limited sources. While nylon materials have better toughness, they lack an antibacterial function. The toothbrush filaments will come into contact with water or food residues in use. Furthermore, the toothbrush filaments are relatively dense, food residues will be left in the toothbrush filaments and difficult to be completely removed. Consequently, a large number of bacteria will breed on the toothbrush filaments as the service time increases, which is prone to induce oral infections after repeated use and affect health. In addition, conventional toothbrushes can only clean the mouth to remove food residues, but they cannot inhibit or eliminate the bacteria on the surfaces of the teeth due to lack of antibacterial function, which is unfavorable to the prevention of some oral diseases, such as caries or periodontitis. Therefore, how to improve the antibacterial properties of the toothbrush filaments has become an urgent problem to be solved.

SUMMARY

An objective of the present application is to provide a toothbrush filament and a preparation method therefor, and a toothbrush to improve the antibacterial properties of the toothbrush filament. The specific technical solutions are as follows:

According to the first aspect of the present application, there is provided a method for preparing a toothbrush filament, comprising the following steps:

(1) adding a piezoelectric polymer into a melt spinning machine, heating to a melting temperature of the piezoelectric polymer, and extruding to obtain a filament having a diameter of 100 μm to 500 μm, wherein the piezoelectric polymer has a piezoelectric constant of 10 pC/N to 32 pC/N; and (2) subjecting the filament to annealing treatment at 120° C. to 150° C. for 1.5 h to 3 h, and then subjecting the filament that has been subjected to the annealing treatment to corona polarization treatment to obtain the toothbrush filament, wherein for the corona polarization treatment, a voltage is 10 kV to 50 kV, a distance between an electrode tip and a sample is 10 mm to 50 mm, a polarization temperature is 25° C. to 50° C., and polarization time is 10 min to 60 min; preferably, for the annealing treatment, the temperature is 120° C. to 140° C. and the time is 2 h to 3 h, and for the corona polarization treatment, the voltage is 20 kV to 50 kV, the distance is 20 mm to 50 mm, the temperature is 25° C. to 50° C., and the time is 10 min to 40 min; or (2') subjecting the filament to corona polarization treatment, and then to annealing treatment at 120° C. to 150° C. for 1.5 h to 3 h to obtain the toothbrush filament, wherein for the corona polarization treatment, a voltage is 10 kV to 50 kV, a distance is 10 mm to 50 mm, a temperature is 25° C. to 50° C., and time is 10 min to 60 min, preferably, for the corona polarization treatment the voltage is 20 kV to 50 kV, the distance is 20 mm to 50 mm, the temperature is 25° C. to 50° C., and the time is 10 min to 40 min, and for the annealing treatment the temperature is 120° C. to 140° C. and the time is 2 h to 3 h.

In some embodiments of the present application, the piezoelectric polymer is at least one selected from the group consisting of polyvinylidene fluoride, a polyvinylidene fluoride-trifluoroethylene copolymer or a polyvinylidene fluoride-hexafluoropropylene copolymer.

According to the second aspect of the present application, there is provided a toothbrush filament obtained by the preparation method according to any one of the embodiments described above.

In some embodiments of the present application, the toothbrush filament produces a voltage of 0.6 V to 1.5 V under the action of an external force.

In some embodiments of the present application, the toothbrush filament has a monofilament bending recovery rate of 60% to 80%.

In some embodiments of the present application, the toothbrush filament has a piezoelectric constant of equal to or greater than 0.4 pC/N in a standing state.

In some embodiments of the present application, the toothbrush filament has a bacterial inhibition rate of 45% to 80%.

According to the third aspect of the present application, there is provided a toothbrush comprising a conventional manual toothbrush or electric toothbrush, which comprises the toothbrush filament according to any one of the embodiments described above.

Advantageous Effects of the Invention

The present application provides a toothbrush filament and a preparation method therefor, and a toothbrush. By preparing toothbrush filaments by the preparation method according to the present application and adjusting and controlling the temperature and time of the annealing treatment and the voltage, distance, temperature and time of the corona polarization treatment to be within the above-mentioned ranges, the prepared toothbrush filaments have good piezoelectricity and monofilament bending recovery rates.

Specifically, the toothbrush filaments have a piezoelectric constant of equal to or greater than 0.4 pC/N in a standing state, and have some polarization charges stably present on their surfaces, which could effectively ameliorate the problem about bacteria breeding on the toothbrush filaments in the standing state with the aid of the principle of physical antibacterial action via electrical stimulation, thereby improving the antibacterial properties of the toothbrush filaments. The voltage generated by the toothbrush filaments under the action of external force (equivalent to the tooth brushing process) is 0.6 V to 1.5 V. In this way, the piezoelectric signals generated from the toothbrush filaments in the brushing process may effectively eliminate the bacteria from the tooth surface, which is conducive to the prevention of dental diseases, such as caries or periodontitis. Furthermore, the toothbrush filaments have a monofilament bending recovery rate of 60% to 80%, and can meet the use requirements for toothbrushes.

Certainly, implementation of any one of the products or methods according to the present application is not necessarily required to achieve all of the above advantages simultaneously.

BRIEF DESCRIPTION OF THE DRAWINGS

To illustrate the examples of the present disclosure and the prior-art technical solutions more clearly, the drawings required for use in the examples and the prior arts are briefly introduced below. Evidently, the drawings described below are merely some examples of the present disclosure. For a person skilled in the art, other drawings may be derived from those drawings without affording any creative efforts.

DETAILED DESCRIPTION

Figure 1:
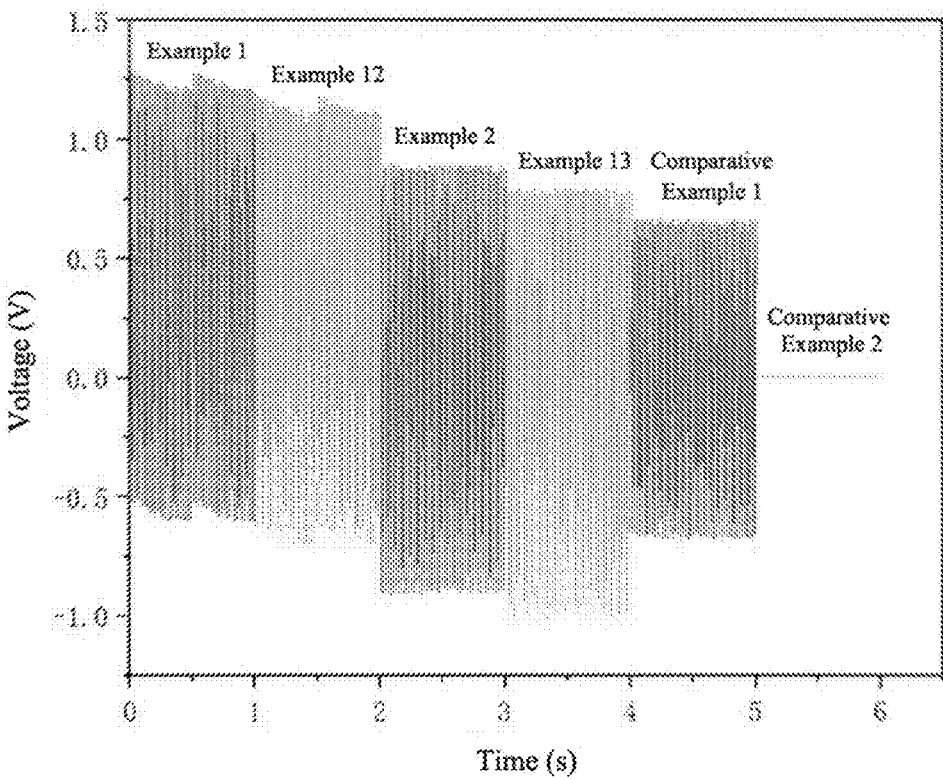
FIG. 1 shows a diagram for test on dynamic piezoelectric signals from the toothbrush filaments in Example 1, Example 2, Example 12, Example 13, Comparative Example 1, and Comparative Example 2 under the action of external force.

To render the purposes, technical solutions, and advantages of the present disclosure clearer, the present disclosure will be further explained in detail below with reference to the drawings and examples. Obviously, the described examples are merely part of, but not all of the examples of the present disclosure. Based on the examples of the present disclosure, all the other examples obtained by a person skilled in the art without affording any creative efforts are within the scope of protection for the present disclosure.

According to the first aspect of the present application, there is provided a method for preparing a toothbrush filament, comprising the following steps:

(1) adding a piezoelectric polymer into a melt spinning machine, heating to the melting temperature of the piezoelectric polymer, and extruding to obtain a filament having a diameter of 100 μm to 500 μm, wherein the piezoelectric polymer has a piezoelectric constant of 8 pC/N to 32 pC/N; and (2) subjecting the filament to annealing treatment at 120° C. to 150° C. for 1.5 h to 3 h, and then subjecting the filament that has been subjected to the annealing treatment to corona polarization treatment to obtain the toothbrush filament, wherein for the corona polarization treatment, the voltage is 10 kV to 50 kV, the distance between an electrode tip and a sample is 10 mm to 50 mm, the polarization temperature is 25° C. to 50° C., and the polarization time is 10 min to 60 min; preferably, for the annealing treatment the temperature is 120° C. to 140° C. and the time is 2 h to 3 h, and for the corona polarization treatment, the voltage is 20 kV to 50 kV, the distance is 20 mm to 50 mm, the temperature is 25° C. to 50° C., and the time is 10 min to 40 min; for example, the temperature of the annealing treatment may be 120° C., 125° C., 130° C., 135° C., 140° C., 145° C., 150° C. or a range between any two of these values, and the time of the annealing treatment may be 1.5 h, 1.8 h, 2 h, 2.2 h, 2.5 h, 3 h or a range between any two of these values; for example, the voltage of the corona polarization treatment may be 10 KV, 20 KV, 30 KV, 40 KV, 50 KV or a range between any two of these values, the distance for the corona polarization treatment may be 10 mm, 20 mm, 30 mm, 40 mm, 50 mm or a range between any two of these values, the temperature of the corona polarization treatment may be 25° C., 30° C., 35° C., 40° C., 45° C., 50° C. or a range between any two of these values, and the time of the corona polarization treatment may be 10 min, 20 min, 30 min, 40 min, 50 min, 60 min or a range between any two of these values; or (2') subjecting the filament to corona polarization treatment, and then to annealing treatment at 120° C. to 150° C. for 1.5 h to 3 h to obtain the toothbrush filament, wherein for the corona polarization treatment, the voltage is 10 KV to 50 KV, the distance is 10 mm to 50 mm, the temperature is 25° C. to 50° C., and the time is 10 min to 60 min, preferably, for the corona polarization treatment the voltage is 20 KV to 50 KV, the distance is 20 mm to 50 mm, the temperature is 25° C. to 50° C., and the time is 10 min to 40 min, and for the annealing treatment the temperature is 120° C. to 140° C. and the time is 2 h to 3 h; for example, the voltage of the corona polarization treatment may be 10 KV, 20 KV, 30 KV, 40 KV, 50 KV or a range between any two of these values, the distance for the corona polarization treatment may be 10 mm, 20 mm, 30 mm, 40 mm, 50 mm or a range between any two of these values, the temperature of the corona polarization treatment may be 25° C., 30° C., 35° C., 40° C., 45° C., 50° C. or a range between any two of these values, and the time of the corona polarization treatment may be 10 min, 20 min, 30 min, 40 min, 50 min, 60 min or a range between any two of these values; for example, the temperature of the annealing treatment may be 120° C., 125° C., 130° C., 135° C., 140° C., 145° C., 150° C. or a range between any two of these values, and the time of the annealing treatment may be 1.5 h, 1.8 h, 2 h, 2.2 h, 2.5 h, 3 h or a range between any two of these values.

By increasing the degree of crystallinity of the polymer, the above annealing treatment contributes to the improvement in plasticity and toughness of the toothbrush filaments and to removal of the residual stress. When the temperature of the annealing treatment is too low (e.g. lower than 120° C.) or the time is too short (e.g. shorter than 1.5 h), the annealing treatment is incomplete, which effects the physical properties of the toothbrush filaments, such as the monofilament bending recovery rate. When the temperature of the annealing treatment is too high (e.g. higher than 150° C.) or the time is too long (e.g. longer than 3 h), not only is the feasibility of practical operations affected, but also the mechanical properties of the toothbrush filaments per se are affected.

The above corona polarization treatment enables the toothbrush filaments to carry some polarization charges on their surfaces to improve the piezoelectric performance of the toothbrush filament. When the voltage of the corona polarization treatment is too low (e.g. lower than 10 KV), the distance is too large (e.g. larger than 50 mm), the temperature is too low (e.g. lower than 25° C.) or the time is too short (e.g. shorter than 10 min), the corona polarization treatment is incomplete, which directly affects the improvement over the piezoelectric performance of the toothbrush filaments. When the voltage of the corona polarization treatment is too high (e.g. higher than 50 KV), the distance is too small (e.g. smaller than 10 mm), the temperature is too high (e.g. higher than 50° C.) or the time is too long (e.g. longer than 60 min), not only does the safety risk of practical operations increases, but the mechanical properties of the toothbrush filaments per se may also be affected.

In general, by subjecting filaments to annealing treatment and then to corona polarization treatment or subjecting filaments to corona polarization treatment and then to annealing treatment according to the above preparation method, and adjusting and controlling the temperature and time of the annealing treatment as well as the voltage, distance, temperature and time of the corona polarization treatment within the above-mentioned ranges, the prepared toothbrush filaments have good piezoelectricity and monofilament bending recovery rates. Specifically, the toothbrush filaments have a piezoelectric constant of equal to or greater than 0.4 pC/N in a standing state, and have some polarization charges stably existing on their surfaces, which could effectively ameliorate the problem about bacteria breeding on the toothbrush filaments in the standing state with the aid of the principle of physical antibacterial action via electrical stimulation, thereby improving the antibacterial properties of the toothbrush filaments. The voltage generated by the toothbrush filaments under the action of external force (equivalent to the tooth brushing process) is 0.6 V to 1.5 V. In this way, the piezoelectric signals generated from the toothbrush filaments in the brushing process may effectively eliminate the bacteria from the tooth surface, which is conducive to the prevention of dental diseases, such as caries or periodontitis. On the premise of satisfying the minimum annealing temperature and time, the toothbrush filaments have a monofilament bending recovery rate of 60% to 80%, which meets the national standard GB 19342-2013 (Toothbrushes) and can meet the use requirements for toothbrushes. The aforementioned external force refers to ultrasonic vibration at 40000 times/min. The piezoelectric constant of the toothbrush filament in a standing state is equal to or greater than 0.4 pC/N and less than the piezoelectric constant of the piezoelectric polymer for preparing toothbrush filaments.

In some embodiments of the present application, the piezoelectric polymer is at least one selected from the group consisting of polyvinylidene fluoride (PVDF), a polyvinylidene fluoride-trifluoroethylene copolymer or a polyvinylidene fluoride-hexafluoropropylene copolymer. The piezoelectric constants of the polyvinylidene fluoride (PVDF), polyvinylidene fluoride-trifluoroethylene copolymer, and polyvinylidene fluoride-hexafluoropropylene copolymer are 18 pC/N to 22 pC/N, 25 pC/N to 29 pC/N, and 27 pC/N to 30 pC/N, respectively. PVDF is a polymorphic semi-crystalline polymer and have three major common crystal forms, which are a phase, $\beta$ phase and y phase, respectively. Among them, the $\beta$ phase is a ferroelectric phase, and its proportion directly determines the polarization charging effect and piezoelectric performance of PVDF. The post-treatment process will directly affect the crystal phases of PVDF. The present application adopts the post-treatment process of the annealing treatment integrated with the corona polarization treatment, which could significantly improve the $\beta$-phase proportion in PVDF, so as to improve the piezoelectric performance of the prepared toothbrush filaments, thereby achieving the antibacterial function of the toothbrush filaments.

The melting temperature of the piezoelectric polymer is not particularly limited in the present application as long as it can fulfill the objective of the present application. For example, the melting temperature of the piezoelectric polymer may be 130° C. to 220° C. Furthermore, the melting temperatures of the above PVDF, polyvinylidene fluoride-trifluoroethylene (PVDF-TrFE), and polyvinylidene fluoride-hexafluoropropylene (PVDF-HFP) are 165° C. to 175° C., 212° C. to 217° C., and 130.9° C. to 180° C. successively. The molecular weight of the piezoelectric polymer is not particularly limited in the present application as long as it can fulfill the objective of the present application. For example, the weight-average molecular weights of the above PVDF, polyvinylidene fluoride-trifluoroethylene, and polyvinylidene fluoride-hexafluoropropylene are 150,000 to 300,000, 100,000 to 200,000, 700,000 to 900,000 successively.

The melt spinning machine used in the above preparation method is not particularly limited in the present application, and may be a melt spinning machine known in the art. The melt spinning machine is not limited in the present application as long as it can fulfill the objective of the present application.

According to the second aspect of the present application, there is provided a toothbrush filament prepared by the preparation method according to any one of the embodiments described above. The toothbrush filaments prepared by the above preparation method have good piezoelectric performance and monofilament bending recovery rates. Specifically, the toothbrush filaments have a piezoelectric constant of equal to or greater than 0.4 pC/N in a standing state, generate a voltage signal of 0.6 V to 1.5 V under the action of external force, and have a monofilament bending recovery rate of 60% to 80%.

In some embodiments of the present application, the toothbrush filaments have a bacterial inhibition rate of 45% to 80%, indicating that they have a good antibacterial activity.

According to the third aspect of the present application, there is provided a toothbrush comprising the toothbrush filaments according to any one of the embodiments described above. The above toothbrush filaments have good piezoelectric performance and monofilament bending recovery rates, such that the toothbrushes provided in the present application have good antibacterial properties and usability, and the piezoelectric response of the toothbrush filaments in the brushing process may also effectively eliminate the bacteria from the tooth surface, which is beneficial in ameliorating dental diseases such as plaque bacteria or periodontitis.

Test Methods and Instruments:

Dynamic Piezoelectric Performance Test:

Filaments were cut into 10 cm in length. A filament was clamped with a fixture, so that it was in a tight state. Conductive adhesives and electrodes were bonded at both ends. The electrodes connecting to both ends were connected to a Keithley electrometer (Keithley 6514) respectively, and ultrasonic vibration with a frequency of 40,000 times/min was applied, such that the filament movement device undergone regular brushing and received the voltage output on the screen.

Static Piezoelectric Performance Test:

The toothbrush filaments in different Examples and Comparative Examples were tested by a quasi-static d33 meter (ZJ-6A, Institute of Acoustics, Chinese Academy of Sciences) to determine the piezoelectric constants d33 of the toothbrush filaments. The toothbrush filament material was placed between the measuring electrodes at both ends of the quasi-static meter by gently clamping its edge with small tweezers. The upper button was gently rotated so that the two electrodes were gently in contact with each other. The data displayed on the screen was recorded. Five points were measured for each filament, and the measured values were averaged as the final test result.

Tests on Tensile Strength and Elastic Modulus:

The initial distance between the fixtures of the tensile testing machine (Instron-1121, Cambridge) was adjusted to 100 mm±5 mm before applying the load. After soaked in deionized water for 1 min, the toothbrush filament was fixed between the two fixtures, and the load was applied at a loading speed that is a crosshead speed of (300±50) mm/min. The relationship between the strain and the load was recorded until the filament was broken, and the tensile strength and elastic modulus were measured.

Tests on Tuft Tensile Force, Tuft Bending Force and Monofilament Bending Recovery Rate:

All the tuft tensile force, tuft bending force, and monofilament bending recovery rate were tested in accordance with the national standard GB 19342-2013.

Test on Antibacterial Properties:

(1) Preparation of brain-heart infusion medium (BHI liquid medium): 7.4 g of BHI powder (200.0 g of bovine brain, 250.0 g of bovine heart extract, 10.0 g of peptone, 2.0 g of glucose, 5.0 g of NaCl, 20.0 g of agar) was weighed, and 400 ml of deionized water was added, mixed well and kept in reserve at 120° C. and high pressure. Preparation of solid medium: after dissolution of the liquid medium, 2% agar powder was added thereto and subjected to autoclaved sterilization; when cooled to 70° C., the resultant was poured into a 9-cm culture dish on an ultra-clean table; after cooling, the culture dish was inverted, sealed, and stored in a refrigerator at 4° C.

(2) *Streptococcus mutans* ua159, a pathogenic bacterium of caries, was selected as the experimental strain. The experimental strain was resuscitated and inoculated on the solid medium, and cultured for 24 h in an incubator under the conditions of 37° C. and 5% $CO_2$. Some colonies were selected and Gram stained, and then the colonial morphology was observed microscopically. After confirmation of no contamination, some colonies were sub-cultured for subsequent use.

(3) After sterilized with anhydrous ethanol, the toothbrush filaments in the Examples and Comparative Examples were co-cultured with *Streptococcus mutans* in the BHI liquid medium for 24 h.

(4) Preparation of staining solution: the fluorescent stain included two categories—SYT09 stains and PI stains, which allowed living bacteria to emit green fluorescence and dead bacteria to emit red fluorescence. Prior to staining, the SYT09 stain and the stain reagent were mixed in equal proportions in the same centrifuge tube (Ep tube) respectively under the dark condition, oscillated, mixed well, and stored in a dark place for subsequent use.

(5) The medium, in which the toothbrush filament and *Streptococcus mutans* were co-cultured in the BHI liquid medium for 24 h, was pipetted to remove the supernatant, and the supernatant was carefully and gently washed once with sterile saline to wash away the suspended bacteria.

(6) An appropriate amount of staining solution was added dropwise to the surface of the plaque biofilm and incubated for 15 min at room temperature in a dark room. The plaque biofilm was carefully rinsed with PBS buffer to remove excess dye, and the toothbrush filaments in the Examples and Comparative Examples were placed on glass slides, and observed and photographed by a confocal laser scanning microscope (CLSM) to obtain the red fluorescence intensity and green fluorescence intensity.

$$\text{Bacterial inhibition rate} = \text{red fluorescence intensity}/$$

$$(\text{red fluorescence intensity} + \text{green fluorescence intensity}) \times 100\%.$$

3 h Absorbance (OD Value) Test:

*Streptococcus mutans* was co-cultured with toothbrush filaments for 24 h. The bacterial solution was pipetted, washed gently with PBS buffer for three times, added to a fresh BHI liquid medium, and further incubated for 3 h. 100 µL of bacterial suspension was measured and placed into a 96-well plate. Five replicate wells were set for each sample, and three replicate samples were set for each group. The OD values at the wavelength of 630 nm were read by the ELISA reader. The smaller the OD value, the better the antibacterial properties of the toothbrush filaments.

The OD values at 0 h, 6 h, 9 h, and 12 h were tested by the same method as described above.

Example 1

(1) 1 Kg of PVDF was weighed, added into a single-screw melt spinning machine, and heated at a heating rate of 10°

C./min to the melting temperature 175° C. of PVDF. After the pellets were completely melted, the resultant was extruded by a spinneret and wound to obtain filaments with a diameter of 265 μm. The piezoelectric constant of PVDF was 19 pC/N.

(2) Afterwards, the filaments were subjected to annealing treatment at 120° C. for 2 h.

(3) Subsequently, the filaments were subjected to corona polarization treatment to obtain toothbrush filaments. For the corona polarization treatment, the voltage was 35 kV, the distance was 35 mm, the temperature was 25° C., and the time was 30 min.

Example 2 to Example 11

The steps were the same as those in Example 1 except for adjusting the relevant preparation parameters according to Table 1. The mass ratio of polyvinylidene fluoride to trifluoroethylene in the polyvinylidene fluoride-trifluoroethylene copolymer was 3:1, and the mass ratio of polyvinylidene fluoride to hexafluoropropylene in the polyvinylidene fluoride-hexafluoropropylene copolymer was 3:1. The piezoelectric constants of the polyvinylidene fluoride-trifluoroethylene copolymer and the polyvinylidene fluoride-hexafluoropropylene copolymer were 26 pC/N and 28 pC/N, successively. The specification of the spinneret may be adjusted to make the diameters of the filaments satisfy the diameters shown in Table 1.

Example 12

(1) 1 Kg of PVDF was weighed, added into a single-screw melt spinning machine, and heated at a heating rate of 10°

C./min to the melting temperature 175° C. of PVDF. After the pellets were completely melted, the resultant was extruded by a spinneret and wound to obtain filaments with a diameter of 265 μm. The piezoelectric constant of PVDF was 19 pC/N.

(2) Afterwards, the filaments were subjected to corona polarization treatment to obtain toothbrush filaments. For the corona polarization treatment, the voltage was 35 kV, the distance was 35 mm, the temperature was 25° C., and the time was 30 min.

(3) Subsequently, the filaments were subjected to annealing treatment at 120° C. for 2 h.

Example 13

The steps were the same as those in Example 12 except for adjusting the relevant preparation parameters according to Table 1.

Comparative Example 1 to Comparative Example 5

The steps were the same as those in Example 1 except for adjusting the relevant preparation parameters according to Table 1. The weight-average molecular weight of nylon was 15,000.

The preparation parameters for the Examples and Comparative Examples were as shown in Table 1 and the performance data were as shown in Table 2.

TABLE 1

| | Piezo-electric Polymer | Piezo-electric Polymer Melting Temp. (° C.) | Filament Diameter (μm) | Annealing Treatment Temp. (° C.) | Annealing Treatment Time (h) | Corona Polar-ization Treatment Voltage (KV) | Corona Polar-ization Treatment Distance (mm) | Corona Polar-ization Treatment Temp. (° C.) | Corona Polar-ization Treatment Time (min) |
|---|---|---|---|---|---|---|---|---|---|
| Ex. 1 | PVDF | 175 | 265 | 120 | 2 | 35 | 35 | 25 | 30 |
| Ex. 2 | PVDF | 175 | 175 | 120 | 2 | 35 | 35 | 50 | 30 |
| Ex. 3 | PVDF | 175 | 175 | 120 | 2 | 35 | 35 | 25 | 30 |
| Ex. 4 | PVDF | 175 | 265 | 120 | 3 | 35 | 35 | 25 | 30 |
| Ex. 5 | PVDF | 175 | 265 | 140 | 2 | 35 | 35 | 25 | 30 |
| Ex. 6 | PVDF | 175 | 175 | 130 | 2 | 10 | 40 | 25 | 60 |
| Ex. 7 | PVDF | 175 | 265 | 130 | 2 | 50 | 40 | 25 | 10 |
| Ex. 8 | PVDF | 175 | 175 | 120 | 2 | 30 | 10 | 30 | 20 |
| Ex. 9 | PVDF | 175 | 265 | 120 | 2 | 40 | 50 | 30 | 20 |
| Ex. 10 | PVDF-TrFE copolymer | 215 | 265 | 120 | 2 | 35 | 35 | 25 | 30 |
| Ex. 11 | PVDF-HFP copolymer | 140 | 265 | 120 | 2 | 35 | 35 | 25 | 30 |
| Ex. 12 | PVDF | 175 | 265 | 120 | 2 | 35 | 35 | 25 | 30 |
| Ex. 13 | PVDF | 175 | 175 | 120 | 2 | 35 | 35 | 50 | 30 |
| Comp Ex. 1 | PVDF | 175 | 175 | / | / | / | / | / | / |
| Comp .Ex. 2 | Nylon | 125 | 170 | / | / | / | / | / | / |
| Comp Ex. 3 | PVDF | 175 | 175 | 70 | 0.3 | 35 | 35 | 25 | 30 |
| Comp Ex. 4 | PVDF | 175 | 175 | 120 | 2 | 5 | 60 | 80 | 5 |
| Comp Ex. 5 | PVDF | 175 | 175 | 70 | 0.3 | 5 | 60 | 80 | 5 |

Note:
The symbol "/" in Table 1 means that the corresponding parameter did not exist.

TABLE 2

| | Max. Output Voltage (V) | Tensile Strength (MPa) | Elastic Modulus (MPa) | Tuft Tensile Force (N) | Tuft Bending Force (N) | Monofilament Bending Recovery Rate (%) | 3 h OD Value | Bacterial Inhibition Rate (%) |
|---|---|---|---|---|---|---|---|---|
| Ex. 1 | 1.27 | 492.9 | 851.6 | 30.7 | 2.90 | 65.78 | 0.0476 | 77.3 |
| Ex. 2 | 0.89 | 410.6 | 837.1 | 26.3 | 0.80 | 68.08 | 0.0500 | 52.8 |
| Ex. 3 | 1.14 | 401.3 | 837.4 | 25.3 | 0.83 | 62.33 | 0.0507 | 48.3 |
| Ex. 4 | 1.02 | 513.1 | 848.5 | 24.1 | 2.83 | 65.71 | 0.0451 | 77.6 |
| Ex. 5 | 1.04 | 460.3 | 829.3 | 23.9 | 3.01 | 70.21 | 0.0470 | 77.4 |
| Ex. 6 | 0.71 | 457.5 | 836.9 | 19.9 | 0.77 | 63.17 | 0.0581 | 46.3 |
| Ex. 7 | 1.15 | 522.4 | 843.9 | 24.6 | 3.19 | 66.67 | 0.0498 | 72.9 |
| Ex. 8 | 0.66 | 398.6 | 839.5 | 18 | 0.64 | 62.11 | 0.0561 | 47.9 |
| Ex. 9 | 0.99 | 429.6 | 854.9 | 21.2 | 2.65 | 68.90 | 0.0570 | 60.4 |
| Ex. 10 | 1.12 | 456.1 | 835.2 | 26.0 | 3.52 | 67.83 | 0.0511 | 51.0 |
| Ex. 11 | 1.09 | 473.7 | 826.5 | 25.9 | 3.62 | 63.54 | 0.0509 | 51.2 |
| Ex. 12 | 1.17 | 492.6 | 829.9 | 26.8 | 2.24 | 77.78 | 0.0479 | 77.1 |
| Ex. 13 | 0.79 | 408.4 | 850.2 | 25.1 | 0.6 | 77.78 | 0.0520 | 52.7 |
| Comp. Ex. 1 | 0.67 | 375.7 | 928.3 | 28.7 | 0.79 | 51.25 | 0.0673 | 26.2 |
| Comp. Ex. 2 | 0 | 264.3 | 87.1 | 21.7 | 1.0 | 48.30 | 0.2320 | 9.2 |
| Comp. Ex. 3 | 0.75 | 398.4 | 934.1 | 19.8 | 0.93 | 32.82 | 0.0584 | 30.5 |
| Comp. Ex. 4 | 0.63 | 382.5 | 829.5 | 20.3 | 0.87 | 63.30 | 0.0591 | 26.9 |
| Comp. Ex. 5 | 0.60 | 389.2 | 869.2 | 21.4 | 0.96 | 36.67 | 0.0623 | 27.5 |

Figure 2:
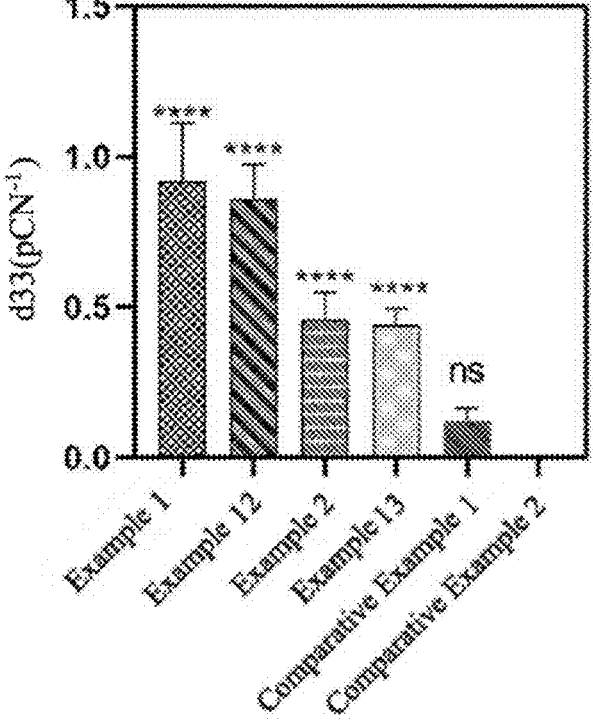
FIG. 2 shows a diagram for test results of the static piezoelectric constants d33 of the toothbrush filaments in Example 1, Example 2, Example 12, Example 13, Comparative Example 1, and Comparative Example 2.

With reference to Table 2 and FIG. 1, as could be appreciated from Example 1 to Example 13 and Comparative Example 1 to Comparative Example 2, the toothbrush filaments prepared by the preparation method provided in the present application exhibited good piezoelectric performance and mechanical strength, and the monofilament bending recovery rates of the toothbrush filaments always met the national standard as the annealing treatment was carried out, so the toothbrush filaments showed good stability; moreover, after the annealing treatment and polarization treatment, the antibacterial activity of the toothbrush filaments was enhanced, and in particular the antibacterial properties of the toothbrush filaments in the Examples of the present application were remarkably improved in comparison to the toothbrush filaments (Comparative Example 2) made of nylon materials commonly used in the prior arts. This is because the annealing treatment and polarization treatment enabled the piezoelectric constant and the degree of crystallinity of $\beta$ phase of PVDF to increase, and thus the electrical property was improved so that the antibacterial properties of the toothbrush filaments were enhanced. Specifically, as shown in FIG. 2, the piezoelectric constants of the toothbrush filaments in Example 1, Example 2, Example 12, and Example 13 in the standing state were 0.92 pC/N, 0.46 pC/N, 0.85 pC/N, and 0.45 pC/N successively, and the 3 h OD values were 0.0476, 0.0500, 0.0489, and 0.0520 respectively. However, the piezoelectric constants d33 of the toothbrush filaments in Comparative Example 1 and Comparative Example 2 were 0.19 pC/N and 0 pC/N respectively, and the 3 h OD values were 0.0673 and 0.2320 respectively. As a result, compared with the toothbrush filaments in the Comparative Examples, the piezoelectric constants d33 of the toothbrush filaments in the Examples of the present application were increased, and their bacteria breeding inhibitory function was also enhanced. Specifically, as shown in FIG. 1, the output voltages of the toothbrush filaments in Example 1, Example 2, Example 12, and Example 13 under the action of external force (equivalent to teeth brushing) were 1.27 V, 0.89 V, 1.17 V, and 0.79 V respectively, and the bacterial inhibition rates reached 77.3%, 52.8%, 77.1%, and 52.7%, whereas there was no voltage output in Comparative Example 2 and its bacterial inhibition rate was only 9.2%, indicating that the toothbrush filaments prepared by the preparation method of the present application showed stable voltage output under the action of dynamic external force and exhibited good antibacterial properties.

Figure 10:
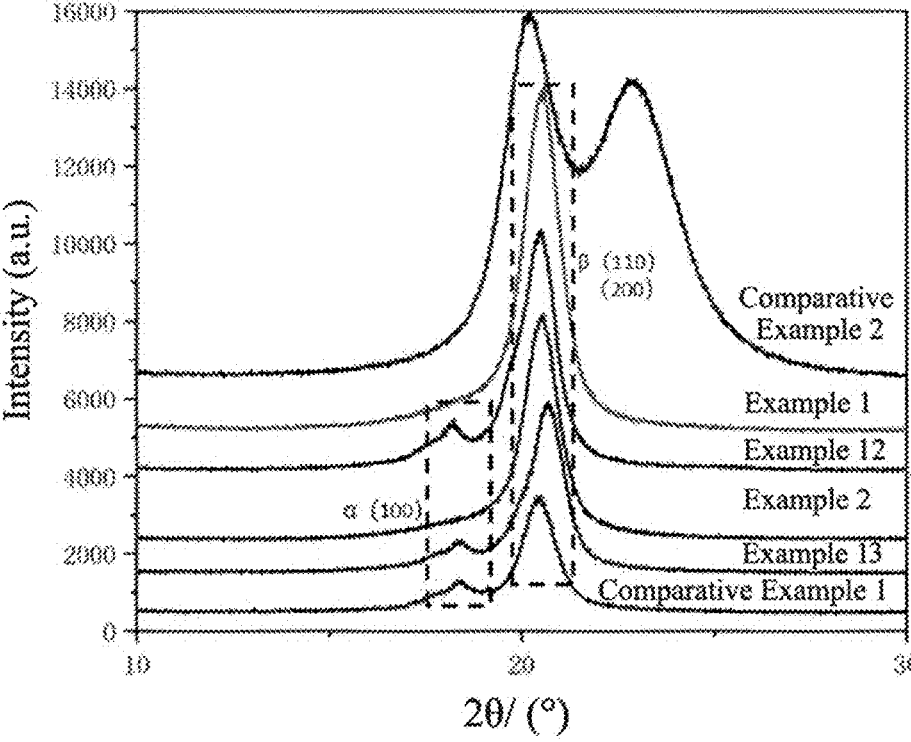
FIG. 10 shows an X-ray diffraction pattern of the toothbrush filaments in Example 1, Example 2, Example 12, Example 13, Comparative Example 1, and Comparative Example 2.

As could be seen from Table 2, the elastic moduli of the toothbrush filaments in the Examples that were prepared by the preparation method of the present application through the annealing treatment and corona polarization treatment were slightly decreased, which might be caused by the change in crystal form of the piezoelectric polymer under high-temperature treatment. The elastic modulus was related to the chemical components and the lattice structure of the material. The details were as shown in FIG. 10. The inventors speculated that with the annealing treatment and corona polarization treatment, the $\alpha$ crystal form of the PVDFs in Example 1 and Example 2 had almost been molten and there were no enough crystal nuclei to form the $\alpha$ crystal form. In the meantime, the $\beta$ crystal form with a high degree of crystallinity and high orientation was produced in Example 1 and Example 2, and the proportions of the $\beta$ crystal form were increased in comparison to that in Comparative Example 1, whereas the $\beta$ crystal form did not exist in Comparative Example 2. Furthermore, although the $\alpha$ crystal form still remained in Example 12 and Example 13, their proportions were also somewhat increased in comparison to the proportion of the $\beta$ crystal form in Comparative Example 1, indicating that the piezoelectric performance of the toothbrush filaments were improved while the elastic moduli were slightly reduced after the annealing treatment and corona polarization treatment in the preparation method of the present application, which was mainly related to the change in crystal form. Although the elastic moduli of the toothbrush filaments were somewhat reduced after annealing as shown in Table 2, they were still remarkably higher than that of the nylon material in Comparative Example 2. Meanwhile, when the toothbrush filaments in the Examples of the present application were made into tufts, all the tufts had a tensile force of equal to or greater than 15N and a bending force of less than 6N, and the tufts were soft tufts specified by the national standard GB 19342-2013, which met the requirements of the national standard and also satisfied the clinicians' recommendations.

With reference to Table 2, as could be appreciated from Example 1 to Example 13 and Comparative Example 3 to Comparative Example 5, when the parameters for the annealing treatment and polarization treatment were within the ranges of the present application, the resulting toothbrush filaments exhibited better antibacterial properties and good monofilament bending recovery rate, tensile strength, elastic modulus, tuft tensile force, and tuft bending force, which met the requirements of the national standard GB 19342-2013.

With reference to Table 2, as could be appreciated from Example 1, Example 10 and Example 11, the toothbrush filaments made of the piezoelectric polymers provided in the present application exhibited good antibacterial properties and good monofilament bending recovery rate, tensile strength, elastic modulus, tuft tensile force, and tuft bending force, which met the requirements of the national standard GB 19342-2013.

Figure 3:
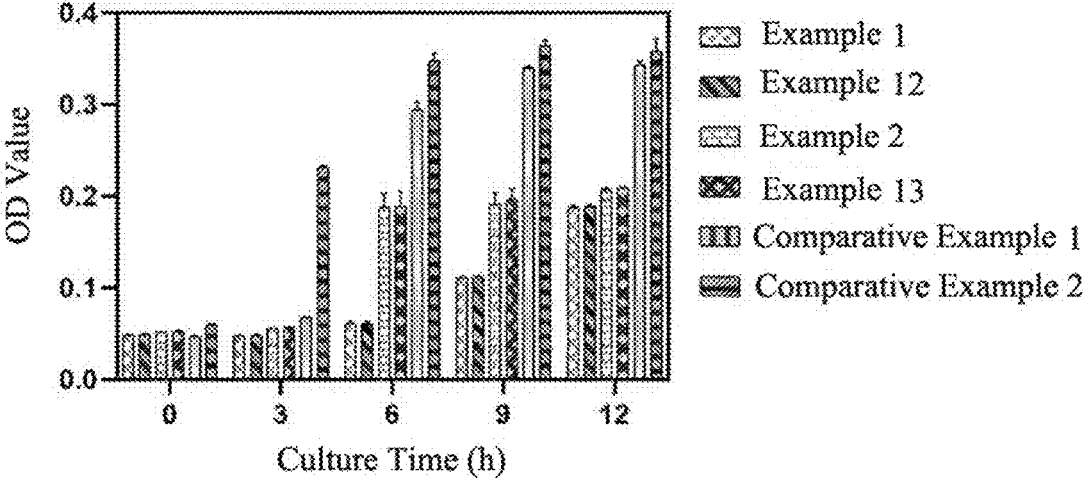
FIG. 3 shows a diagram for test on antibacterial properties of the toothbrush filaments in Example 1, Example 2, Example 12, Example 13, Comparative Example 1, and Comparative Example 2.
Figure 4A:
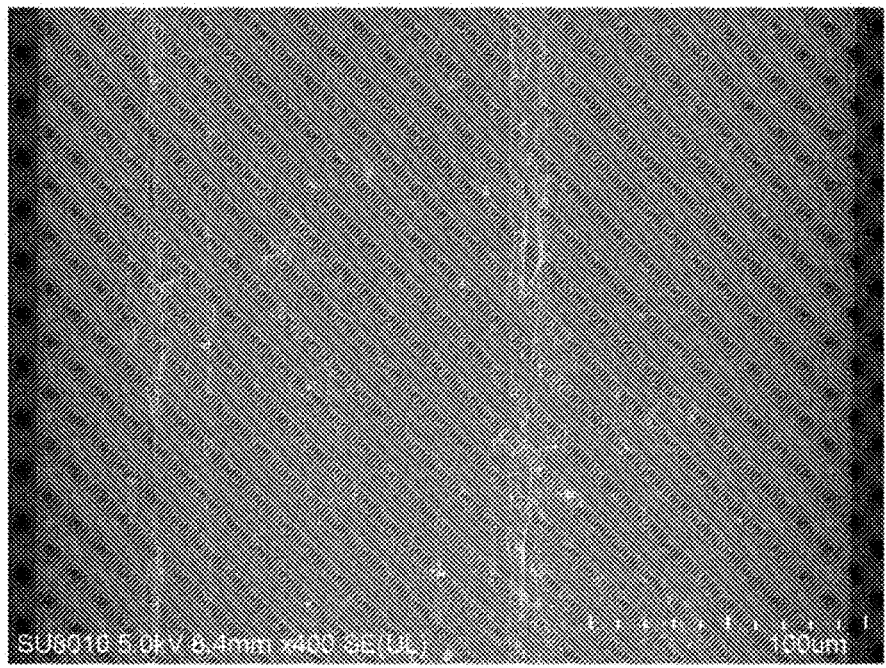
FIG. 4A (400 folds) and FIG. 4B (5000 folds) show electron microscopic images of the toothbrush filaments in Example 1 after co-cultured with bacteria for 24 h.
Figure 4B:
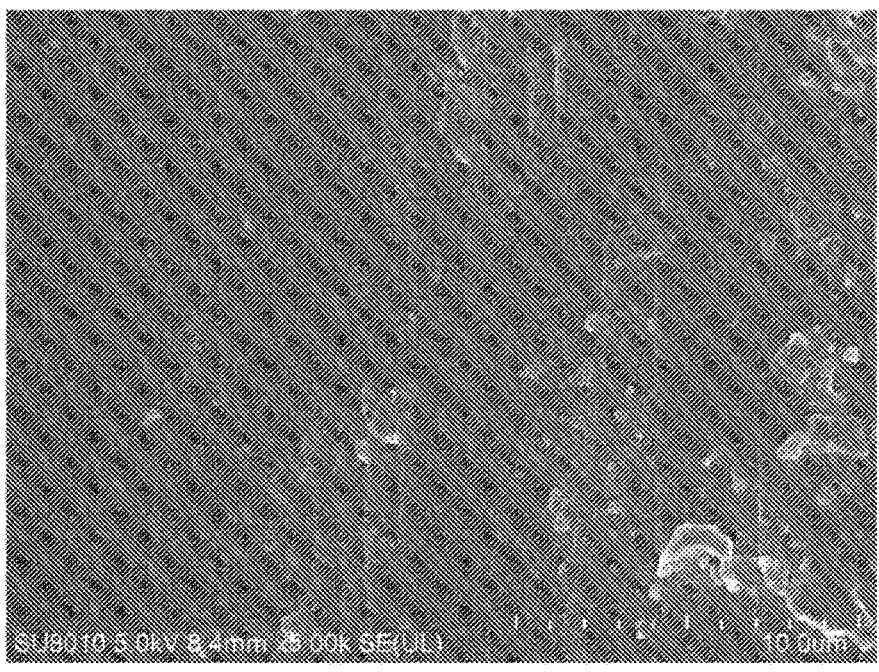
Figure 5A:
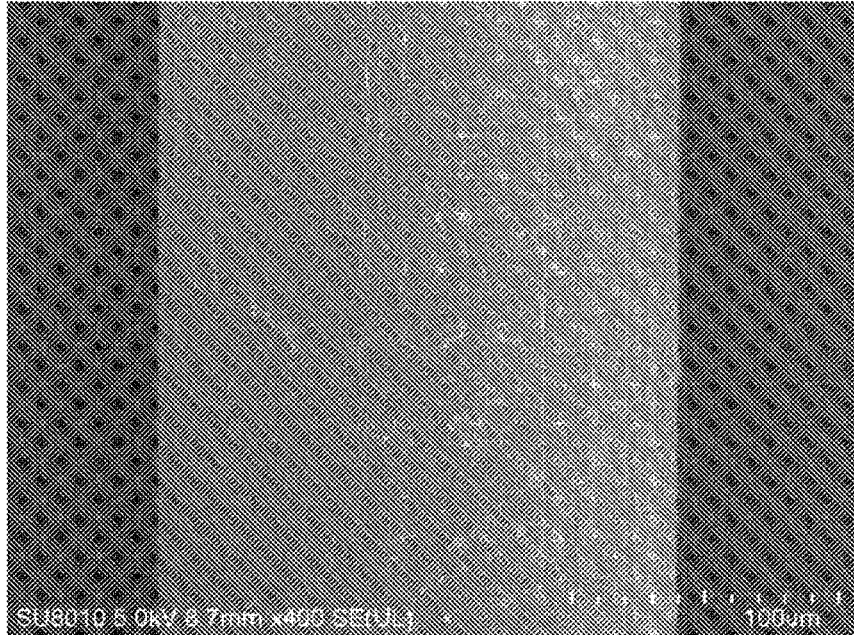
FIG. 5A (400 folds) and FIG. 5B (5000 folds) show electron microscopic images of the toothbrush filaments in Example 2 after co-cultured with bacteria for 24 h.
Figure 5B:
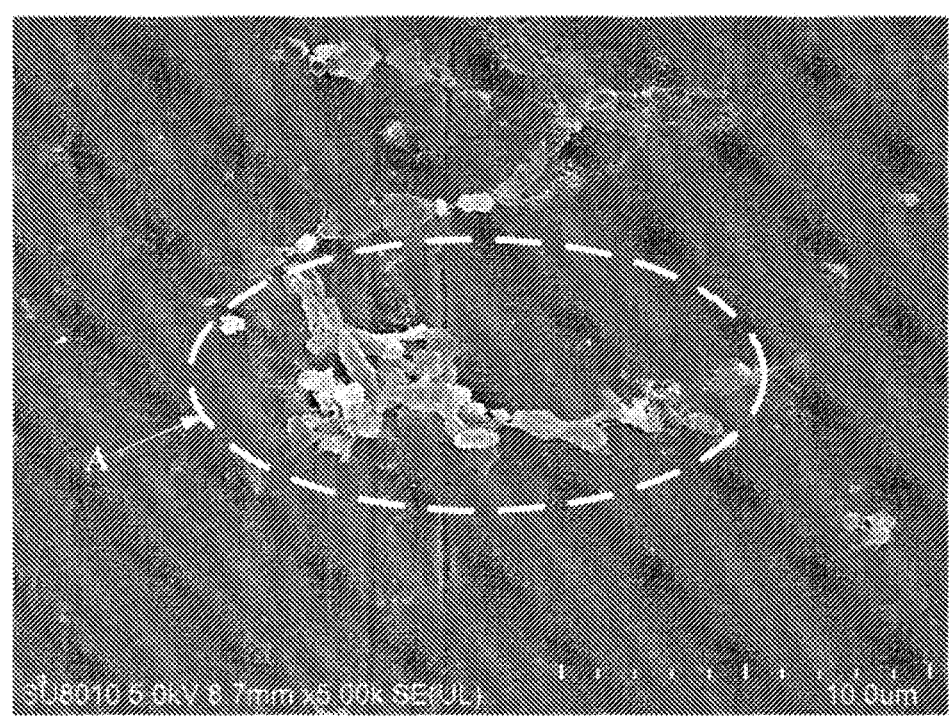
Figure 6A:
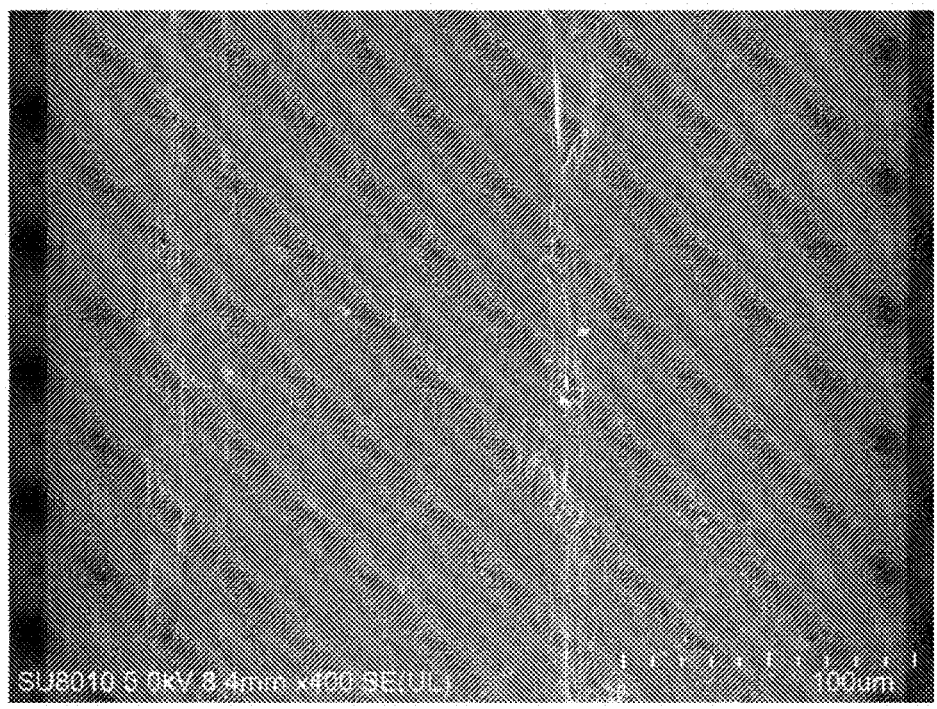
FIG. 6A (400 folds) and FIG. 6B (5000 folds) show electron microscopic images of the toothbrush filaments in Example 12 after co-cultured with bacteria for 24 h.
Figure 6B:
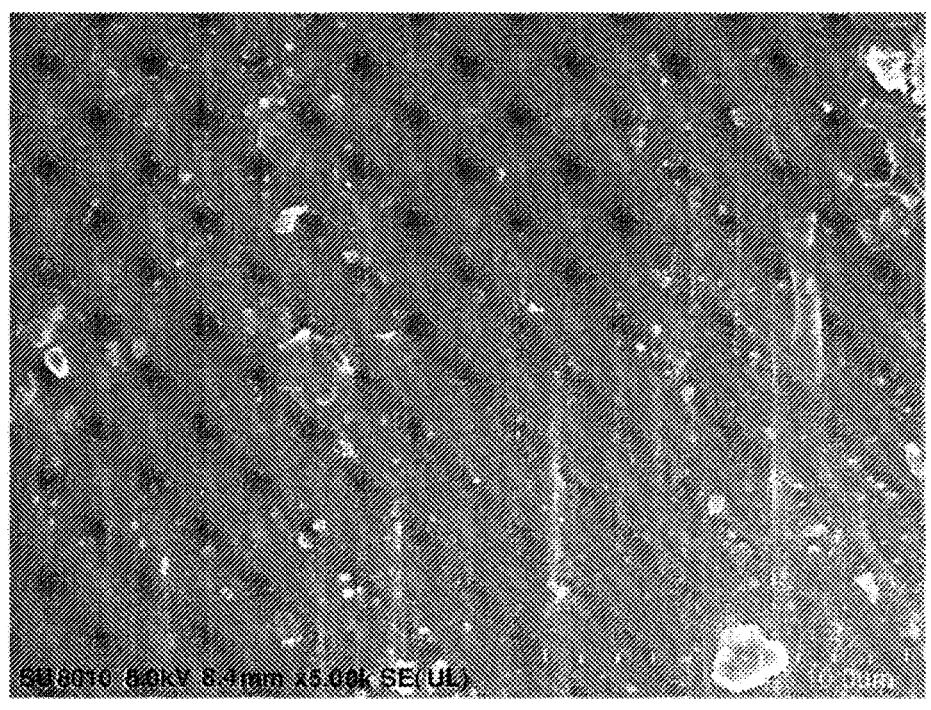
Figure 7A:
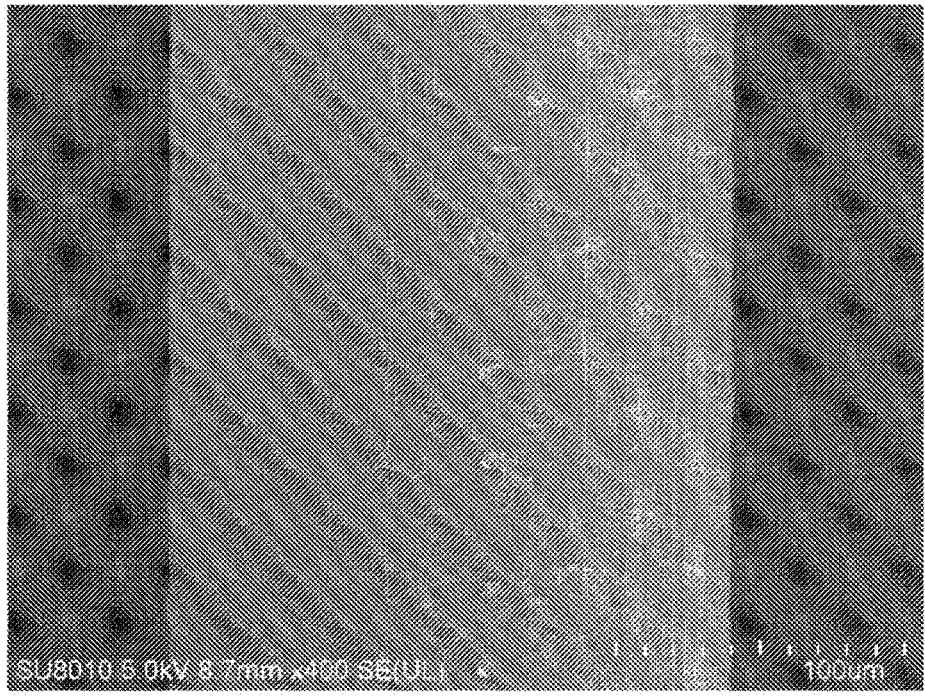
FIG. 7A (400 folds) and FIG. 7B (5000 folds) show electron microscopic images of the toothbrush filaments in Example 13 after co-cultured with bacteria for 24 h.
Figure 7B:
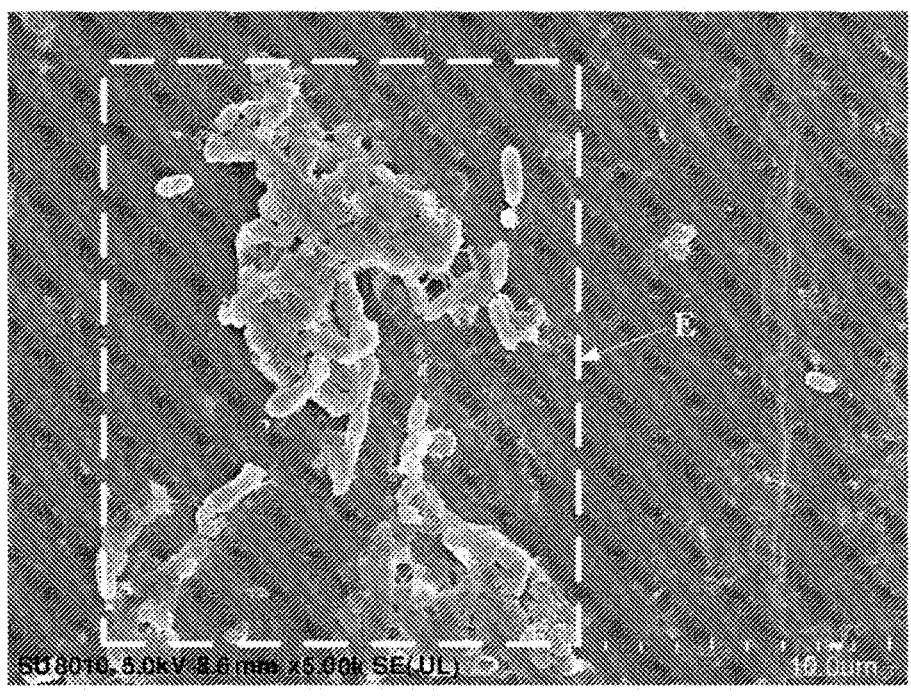
Figure 8A:
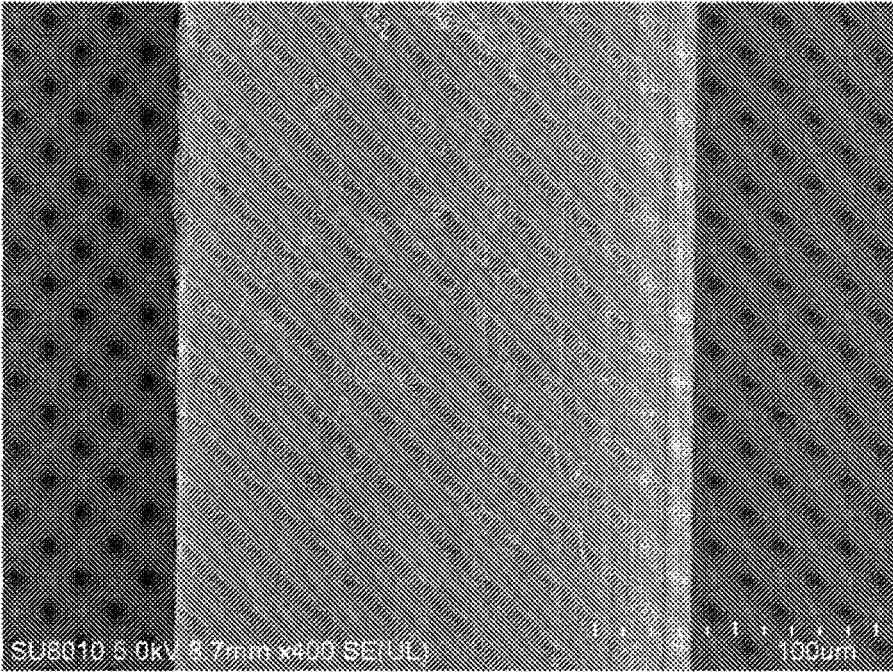
FIG. 8A (400 folds) and FIG. 8B (5000 folds) show electron microscopic images of the toothbrush filaments in Comparative Example 1 after co-cultured with bacteria for 24 h.
Figure 8B:
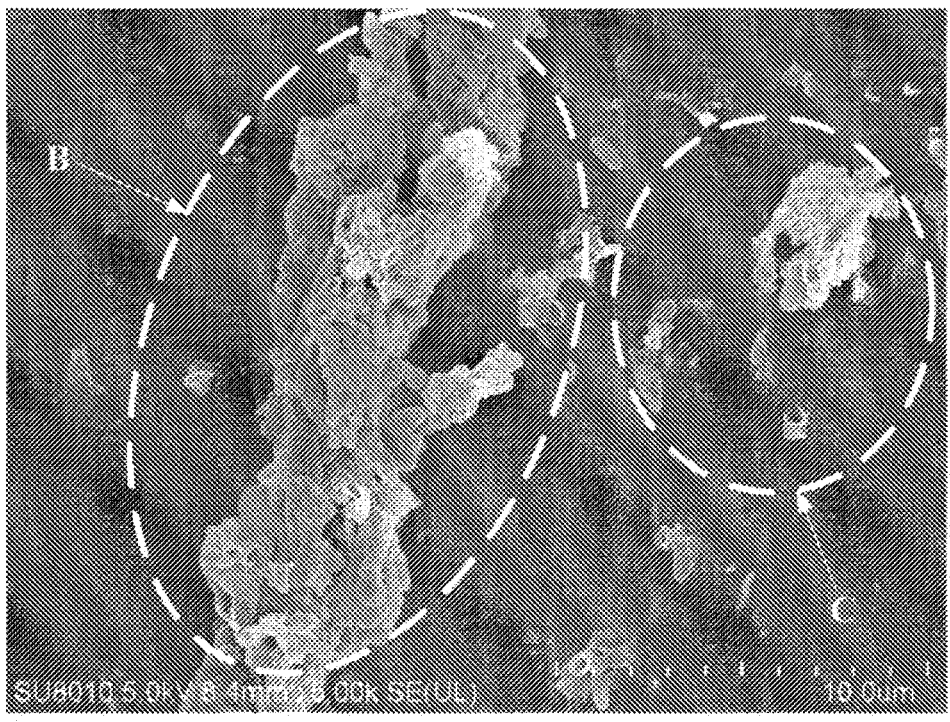

Specifically, with reference to Table 2 and FIG. 3, in the test on antibacterial properties, the higher the OD value of the culture solution, the faster the *Streptococcus mutans* grew, the higher the concentration per unit volume, the poorer the antibacterial properties of the toothbrush filaments. As shown in Table 2, after the toothbrush filaments in Example 1 to Example 13 were co-cultured with *Streptococcus mutans* for 3 h in the test on antibacterial properties, all the OD values of the culture solutions were lower than those in Comparative Example 1 to Comparative Example 5; meanwhile, as shown in FIG. 3, after cultured for 6 h, 9 h, and 12 h, all the OD values of the culture solutions in the Examples were still lower than those in the Comparative Examples, which indicated that the toothbrush filaments prepared by the preparation method provided in the present application exhibited good antibacterial properties.

Figure 9A:
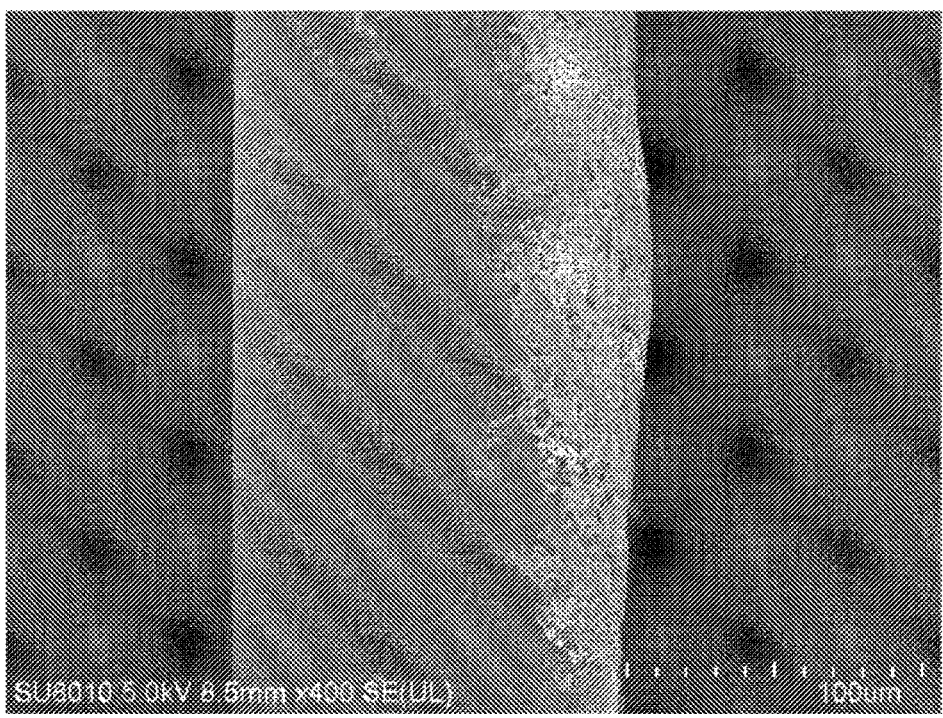
FIG. 9A (400 folds) and FIG. 9B (5000 folds) show electron microscopic images of the toothbrush filaments in Comparative Example 2 after co-cultured with bacteria for 24 h.
Figure 9B:
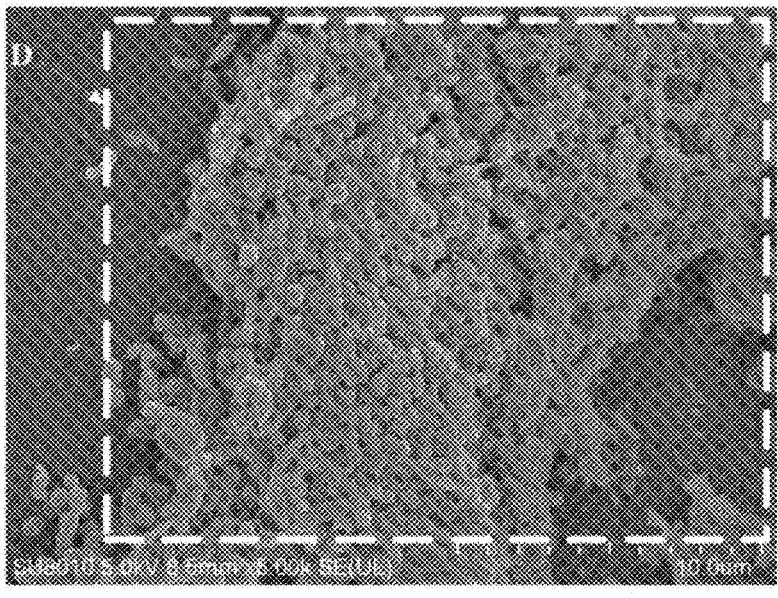

Specifically, as shown in FIG. 4A to FIG. 9B, after the toothbrush filaments provided in Example 1, Example 2, Example 12, Example 13, Comparative Example 1, and Comparative Example 2 were co-cultured with *Streptococcus mutans* for 24 h respectively, FIG. 4A, FIG. 4B, FIG. 6A, and FIG. 6B showed that there were substantially no attached matters (i.e., *Streptococcus mutans*) on the surfaces of the toothbrush filaments in Example 1 and Example 12. There were very few *Streptococcus mutans* bacteria on the surfaces of the toothbrush filaments in Example 2 (as shown in area A in FIG. 5B) and Example 13 (as shown in area E in FIG. 7B), while at the same magnification, a large number of *Streptococcus mutans* bacteria were present on the surfaces of the toothbrush filaments in Comparative Example 1 and Comparative Example 2 (as shown in areas B and C in FIG. 8B and area D in FIG. 9B), and in particular in Comparative Example 2, the surface of the toothbrush filament was basically covered with *Streptococcus mutans* bacteria as shown in FIG. 9B. This indicated that the toothbrush filaments prepared by the preparation method provided in the present application could effectively reduce the growth or reproduction of bacteria on the surfaces thereof, and the problem about bacteria breeding on the surfaces thereof were significantly ameliorated especially in comparison to the toothbrush filaments made of nylon materials commonly used in the existing technologies. At the same time, by applying the toothbrush filaments of the present application to toothbrushes, the piezoelectric response of the toothbrush filaments in the brushing process could also effectively eliminate the bacteria from the tooth surface, which was beneficial in ameliorating dental diseases, such as plaque bacteria or periodontitis.

The above descriptions are only preferred examples of the present disclosure and are not intended to limit the present disclosure. Any modifications, equivalent substitutions, improvements, etc. made within the spirit and principles of the present disclosure.

The invention claimed is:

1. A method for preparing a toothbrush filament, comprising the following steps:

(1) adding a polyvinylidene fluoride piezoelectric polymer having a weight-average molecular weight of 150,000 to 300,000 into a melt spinning machine, heating to a melting temperature of the piezoelectric polymer, and extruding to obtain a filament having a diameter of 175 μm to 265 μm, wherein the piezoelectric polymer has a piezoelectric constant of 10 pC/N to 32 pC/N;

(2) subjecting the filament to annealing treatment at 120° C. for 1.5 h to 3 h, and then to corona polarization treatment to obtain the toothbrush filament, wherein for the corona polarization treatment, a voltage is 10 kV to 50 kV, a distance between an electrode tip to a sample is 10 mm to 50 mm, a polarization temperature is 25° C. to 50° C., and polarization time is 10 min to 60 min; or (2') subjecting the filament to corona polarization treatment, and then to annealing treatment at 120° C. for 1.5 h to 3 h to obtain the toothbrush filament, wherein for the corona polarization treatment, a voltage is 10 kV to 50 kV, a distance between an electrode tip to a sample is 10 mm to 50 mm, a polarization temperature is 25° C. to 50° C., and polarization time is 10 min to 60 min;

the voltage generated by the toothbrush filament under the action of external force is 0.6V to 1.5V;

the single-filament bending recovery rate of the toothbrush filament is 60% to 80%;

the antibacterial rate of the toothbrush filaments is 45% to 80%;

the toothbrush filament has a piezoelectric constant of equal to or greater than 0.4 pC/N in a standing state.

2. A toothbrush filament obtained according to the preparation method of claim 1.

3. A toothbrush, comprising the toothbrush filament according to claim 2.

* * * * *